US009319418B2

(12) United States Patent
Broerman et al.

(10) Patent No.: US 9,319,418 B2
(45) Date of Patent: Apr. 19, 2016

(54) METHOD AND APPARATUS FOR SOFTWARE DOWNLOADS IN A NETWORK (75) Inventors: Keith R. Broerman, Carmel, IN (US); Aaron M. Smith, Noblesville, IN (US); Steven C. Rhoads, Carmel, IN (US); Gary R. Gutknecht, Noblesville, IN (US)

(73) Assignee: Thomson Licensing, Issy les Moulineaux (FR)

( * ) Notice: Subject to any disclaimer, the term of this patent is extended or adjusted under 35 U.S.C. 154(b) by 1084 days.

(21) Appl. No.: 12/596,924

(22) PCT Filed: Apr. 16, 2008

(86) PCT No.: PCT/US2008/004916
§ 371 (c)(1),
(2), (4) Date: Mar. 1, 2010

(87) PCT Pub. No.: WO2008/133824
PCT Pub. Date: Nov. 6, 2008

(65) Prior Publication Data
US 2010/0333174 A1  Dec. 30, 2010

Related U.S. Application Data

(60) Provisional application No. 60/925,810, filed on Apr. 23, 2007.

(51) Int. Cl.
*H04L 29/06* (2006.01)
*H04L 12/66* (2006.01)
(Continued)

(52) U.S. Cl.
CPC .............. *H04L 63/126* (2013.01); *H04L 67/34* (2013.01); *G06F 2221/2129* (2013.01); *H04L 12/66* (2013.01); *H04L 29/06408* (2013.01); *H04L 29/08117* (2013.01); *H04L 45/563* (2013.01)

(58) Field of Classification Search
CPC ....... H04L 63/126; H04L 67/34; H04L 12/66; H04L 29/06408; H04L 29/08117; H04L 45/563; G06F 2221/2129
USPC ................................................ 713/155; 726/2
See application file for complete search history.

(56) References Cited

U.S. PATENT DOCUMENTS 5,958,051 A  9/1999  Renaud et al.
7,281,134 B2 * 10/2007  Schmit ......................... 713/182
(Continued)

FOREIGN PATENT DOCUMENTS

EP  0 848 316 A  6/1998
EP  1 667 453 A  6/2006
(Continued)

OTHER PUBLICATIONS

Search Report dtd Oct. 9, 2008.

*Primary Examiner* — Krisna Lim
(74) *Attorney, Agent, or Firm* — Robert D. Shedd (57) ABSTRACT

Files associated with the operation of gateway and client devices in a network may be downloaded with minimal operator intervention. Accordingly, a method includes receiving data including a first file, a first authentication element, and a second authentication element, the first authentication element being unique to a client device associated with the gateway device. The method also includes determining if the second authentication element is valid for the gateway device and storing the first authentication element and the second file for the client device if the second authentication element is valid for the gateway device. An apparatus includes a receiver that receives data, a processor that determines if the second authentication element is valid for the gateway device, and a memory that stores the first authentication element and a portion of the data for the client device if the second authentication element is valid for the gateway device.

14 Claims, 7 Drawing Sheets

(51) Int. Cl.
  *H04L 12/771*     (2013.01)
  *H04L 29/08*      (2006.01)

(56) References Cited

U.S. PATENT DOCUMENTS

| | | | |
|---|---|---|---|
| 7,421,576 B1 * | 9/2008 | Kent ............................. | 713/155 |
| 7,523,490 B2 * | 4/2009 | Guo et al. ...................... | 726/10 |
| 7,742,605 B2 * | 6/2010 | Hornak ......................... | 380/277 |
| 2002/0095569 A1 * | 7/2002 | Jerdonek ...................... | 713/155 |
| 2003/0217126 A1 * | 11/2003 | Polcha et al. ....... | G06F 9/44505 709/220 |
| 2003/0229781 A1 * | 12/2003 | Fox et al. ...................... | 713/155 |
| 2004/0039919 A1 | 2/2004 | Takayama et al. | |
| 2004/0088423 A1 * | 5/2004 | Miller et al. .......... | H04L 12/585 709/229 |
| 2004/0109518 A1 * | 6/2004 | Miller et al. ......... | G06Q 20/027 375/356 |
| 2005/0005098 A1 | 1/2005 | Michaelis et al. | |
| 2005/0071385 A1 * | 3/2005 | Rao ............................... | 707/200 |
| 2005/0160098 A1 * | 7/2005 | Campbell et al. ...... | G06Q 30/04 1/1 |
| 2005/0220126 A1 * | 10/2005 | Gervais et al. ................ | 370/401 |
| 2007/0192857 A1 * | 8/2007 | Ben-Itzhak ............. | G06F 21/54 726/22 |

FOREIGN PATENT DOCUMENTS

| | | |
|---|---|---|
| JP | 1997191318 | 7/1997 |
| JP | 10105449 | 4/1998 |
| JP | 2003218859 | 7/2003 |
| JP | 200472184 | 3/2005 |
| JP | 2005340978 | 12/2005 |
| JP | 2006522988 | 10/2006 |
| UA | 18443 | 11/2006 |

* cited by examiner

METHOD AND APPARATUS FOR SOFTWARE DOWNLOADS IN A NETWORK

CROSS REFERENCE TO RELATED APPLICATION

This application claims the benefit under 35 U.S.C. §365 of international Application PCT/US2008/004916, filed Apr. 16, 2008, which was published in accordance with PCT article 21(2) on Nov. 6, 2008, in English and which claims the benefit under 35 U.S.C. §119 of a provisional application 60/925,810 filed in the United States on Apr. 23, 2007.

BACKGROUND OF THE INVENTION

1. Field of the Invention

The embodiments presented herein generally relate to gateway devices that may be used to provide services for client devices in a multi-dwelling unit (MDU) network, and more particularly, to mechanisms for downloading files associated with the operation of gateway and client devices in such a network.

2. Background Information

Systems for providing services such as satellite television service have been deployed that utilize a structure that is complementary to the needs of multi-user operation in a single location such as multiple dwelling buildings or apartments. The arrangement of the system used for an installation such as an MDU installation often includes client devices connected through a local network to a central device, or gateway device, that is connected to the service provider's network.

Problems may often be related to these systems when they include field-upgradeable devices, otherwise referred to as field-upgradable systems. In particular, field-upgradable systems may require operator intervention on a per-unit basis to initiate a software upgrade. As a result, the amount of effort needed for an upgrade thus scales with the number of fielded units. Further, typical field-upgradeable systems do not provide an automated way of introducing advanced features/capabilities at one or more selected installations or at one or more gateway devices at a given installation.

In addition, issues may exist with the security and authenticity of various types of files (e.g., executable files, configuration files, key files, etc.) used in upgrading network devices. A gateway device may maintain an updated inventory of client device files for use in downloading to the client devices following a client device reboot. The manufacturer of each client device model provides an executable code file that for security purposes is signed using a key generated by the service operator or manufacturer. One way of addressing the problem is to have the gateway device maintain a list of the keys and algorithms used to sign client device files, or equivalently, maintain a set of signature verification routines, one per client device model. However, this requirement is difficult to manage as the number of client models and manufacturers proliferate in a fielded system. Additionally, service operators and manufacturers are reluctant to release key or algorithmic information used to sign client device files.

In summary, a method is needed to verify the data integrity and source (non-repudiation) of client device files, without incurring the overhead of per-model key/algorithm lists, assuming this information is even made available by the operator or manufacturer If file signing is performed using a public-private key cryptosystem, a standard approach is for the gateway device to maintain a list of the public keys or X.509 device certificates containing the public keys used to sign the client device files, or equivalently, for the gateway device to maintain one or more signature verification functions containing an embedded public key (one signature verification function needed per public/private key pair). Likewise, if a secret key is used to sign a client device file, a signature verification function must be provided that embeds the secret key and verification algorithm. These verification functions must be managed and applied to the corresponding client model numbers.

A further complication exists when additional client device models are added to the system. The fielded gateway device needs to manage a growing list of client keys/verification functions and apply them to the corresponding client device model numbers. Therefore, there is a need for an improved method of downloading files for use with devices in a network and further there is a need for an improved security or authentication system for use with multiple devices in a network. The disclosed embodiments address one or more of these problems.

SUMMARY OF THE INVENTION

In accordance with an aspect of the present embodiments, a method for providing data from a signal source to a gateway device in a network is disclosed. According to an exemplary embodiment, the method includes the steps of receiving a first file, a first authentication element, and a second authentication element, the first authentication element being unique to a client device associated with the gateway device, determining if the second authentication element is valid for the gateway device, and storing the first authentication element and a second file for the client device if the second authentication element is valid for the gateway device.

In accordance with another aspect of the present embodiments, a gateway device is disclosed. According to an exemplary embodiment, the gateway device includes a terminal that receives data including a first authentication element, and a second authentication element, the first authentication element being unique to a client device associated with the gateway device, a processor that determines if the second authentication element is valid for the gateway device, and a memory that stores the first authentication element and a portion of the received data for the client device if the second authentication element is valid for the gateway device.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

The exemplifications set out herein illustrate preferred embodiments of the disclosure, and such exemplifications are not to be construed as limiting the scope of the disclosure in any manner.

DESCRIPTION OF THE PREFERRED EMBODIMENTS

The embodiments described are primarily directed towards installation systems found in multiple dwelling units. The embodiments may also be used and applied in any network information distribution system utilizing a head-end or gateway interface providing content over a data network to client devices, settop boxes, or receiving circuits. For example, the embodiments described may be modified using techniques known to one skilled in the art to work in an airplane or motorbus passenger entertainment distribution system.

Figure 1:
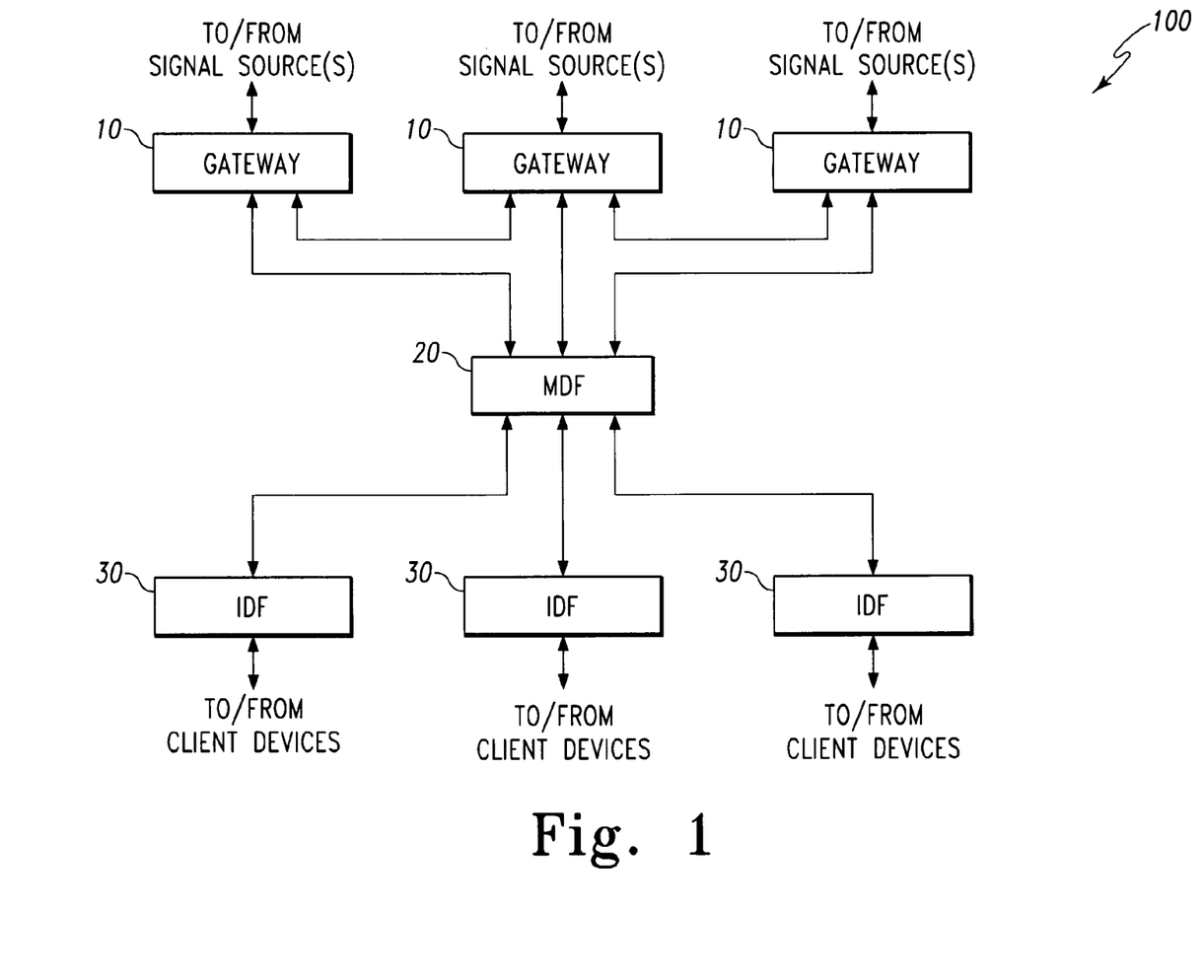
FIG. 1 is a block diagram illustrating an exemplary system using embodiments of the present disclosure.

Referring now to the drawings, and more particularly to FIG. 1, an exemplary system 100 using embodiments of the present disclosure is shown. As indicated in FIG. 1, exemplary system 100 includes gateway devices 10, a main distribution frame (MDF) 20, and intermediate distribution frames (IDFs) 30. Exemplary system 100 also includes one or more signal sources and client devices, not shown. According to an exemplary embodiment, FIG. 1 represents a typical system that may be employed in an MDU using an Ethernet or other type of network, such as coaxial cable, digital subscriber line (DSL), powerline networking, wireless technology, or the like.

In FIG. 1, each gateway device 10 is operatively coupled to and communicates with a signal source (i.e., service provider), such as the headend of a satellite, terrestrial, cable, internet and/or other type of broadcast system. According to an exemplary embodiment, each gateway device 10 receives multiple signals including audio, video and/or data content from the signal source(s), converts the signal format of the received signals and then sends appropriate data streams in a format, such as the internet protocol (IP) format, through the network via MDF 20 and IDFs 30 to the client devices (e.g., set-top boxes, televisions, etc.) based on requests made by users in the respective dwelling units. As is known in the art, MDF 20 and IDFs 30 operate as switching and routing devices. The number of gateway devices 10, MDFs 20 and IDFs 30 included in a given MDU installation may vary based on design choice. Each IDF 30 may for example service client devices present on a given floor and/or other defined portion of an MDU. Although system 100 is shown and described herein as being an Ethernet network using a specific network format, those skilled in the art will appreciate that the principles of the present embodiments may also be applied to other types of networks such as networks using coaxial cable, digital subscriber line (DSL), powerline networking, and/or wireless technologies, and a number of possible network formats. According to exemplary embodiments of the present disclosure which will hereinafter be described, each gateway device 10 is operative to enable files associated with the operation of gateway device 10 and client devices to be downloaded with minimal operator intervention.

It is important to note that more than one gateway device 10 may be connected to the same system service provider headend. Multiple gateway devices 10 may be needed in order to receive and distribute all of the available content from the service provider due to design constraints of the size or capability of a single gateway device 10. Further, the gateway devices 10 may include the ability to connect and communicate between each other independent of, or in conjunction with, the local network connection made to MDFs 20.

In addition to other functions associated with managing data between signal sources and client devices, one or more of the gateway devices may include elements, embodied as hardware, software, firmware, or some combination of the preceding, for receiving a first file, a first authentication element, and a second authentication element, the first authentication element being unique to a client device associated with the gateway device. One or more gateway devices 10 may also include elements, embodied as hardware, software, firmware, or some combination of the preceding, for determining if the second authentication element is valid for the gateway device. The elements may also be used for storing the first authentication element and a data file, such as an executable program file, for the client device if the second authentication element is valid for the gateway device. Also, one or more gateway devices 10 may include elements, embodied as hardware, software, firmware, or some combination of the preceding, for transmitting the first authentication element and the data file from the gateway device 10 to one or more of the client devices.

Figure 2:
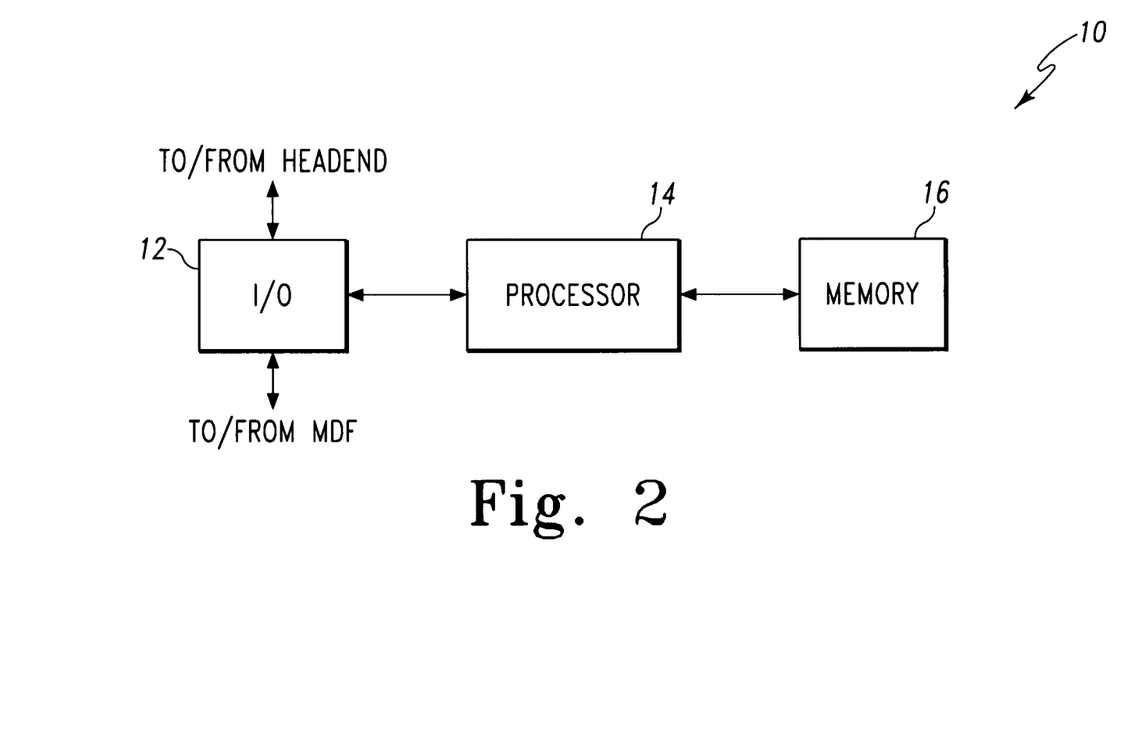
FIG. 2 is a block diagram illustrating a relevant portion of one of the gateway devices of FIG. 1.

Referring to FIG. 2, a block diagram illustrating a relevant portion of one of the gateway devices 10 of FIG. 1 is shown. Gateway device 10 of FIG. 2 includes input/output (I/O) block 12, processor 14, and memory 16. For clarity of description, certain conventional elements associated with gateway device 10 such as certain control signals, power signals and/or other elements may not be shown in FIG. 2.

I/O block 12 is operative to perform I/O functions of gateway device 10 including receiving signals from signal sources and receiving and transmitting signals to client devices. According to an exemplary embodiment, I/O block 12 is operative to receive signals such as audio, video and/or data signals in analog and/or digital format from one or more signal sources such as satellite, terrestrial, cable, or the internet. I/O block 12 is also operative to output signals to the one or more signal sources. I/O block 12 is also operative to transmit and receive signals to and from the client devices through MDF 20.

Processor 14 is operative to perform various signal processing and control functions of gateway device 10. According to an exemplary embodiment, processor 14 is operative to process the audio, video and/or data signals received by I/O block 12 so as to place those signals in a format that is suitable for transmission to and processing by the client devices.

Processor 14 is also operative to execute software code that enables files associated with the operation of gateway device 10 and client devices to be downloaded with minimal operator intervention. Further details regarding this aspect of processor 14 and its associated functions will be provided later herein. Processor 14 is also operative to perform and/or enable other functions of gateway device 10 including, but not limited to, processing user inputs made via a user input device, not shown, reading and writing data from and to memory 16, and other operations as known to those skilled in the art. In a preferred embodiment, processor 14 includes a microprocessor device capable of receiving information from I/O block 12 including a first file, a first authentication element, and a second authentication element. Processor 14 determines if the second authentication element is valid for the gateway device and provides the first authentication element and a second file, associated with the first file, for storage, transmission, and later use by one or more client devices if the second authentication element is valid for the gateway device. The association between the first file and the second file may include, but is not limited to, the first file containing metadata identifying the second file and the second file being contained within the first file.

Memory 16 is operatively coupled to processor 14 and performs data storage functions of gateway device 10. According to an exemplary embodiment, memory 16 may store data including, but not limited to, various types of files including executable and configuration files, various types of identification information for gateway device 10 and all associated client devices, and other data as described herein. At least a portion of memory 16 may be non-volatile.

The gateway devices 10 may be configured to receive a number of different types of broadcast signals including a plurality of satellite signals. Gateway devices 10 may also be configured to produce a plurality of network data signals containing audio and video content provided in the broadcast signals, and to provide the network data signals over the network connecting the gateway devices 10 to client devices.

Figure 3:
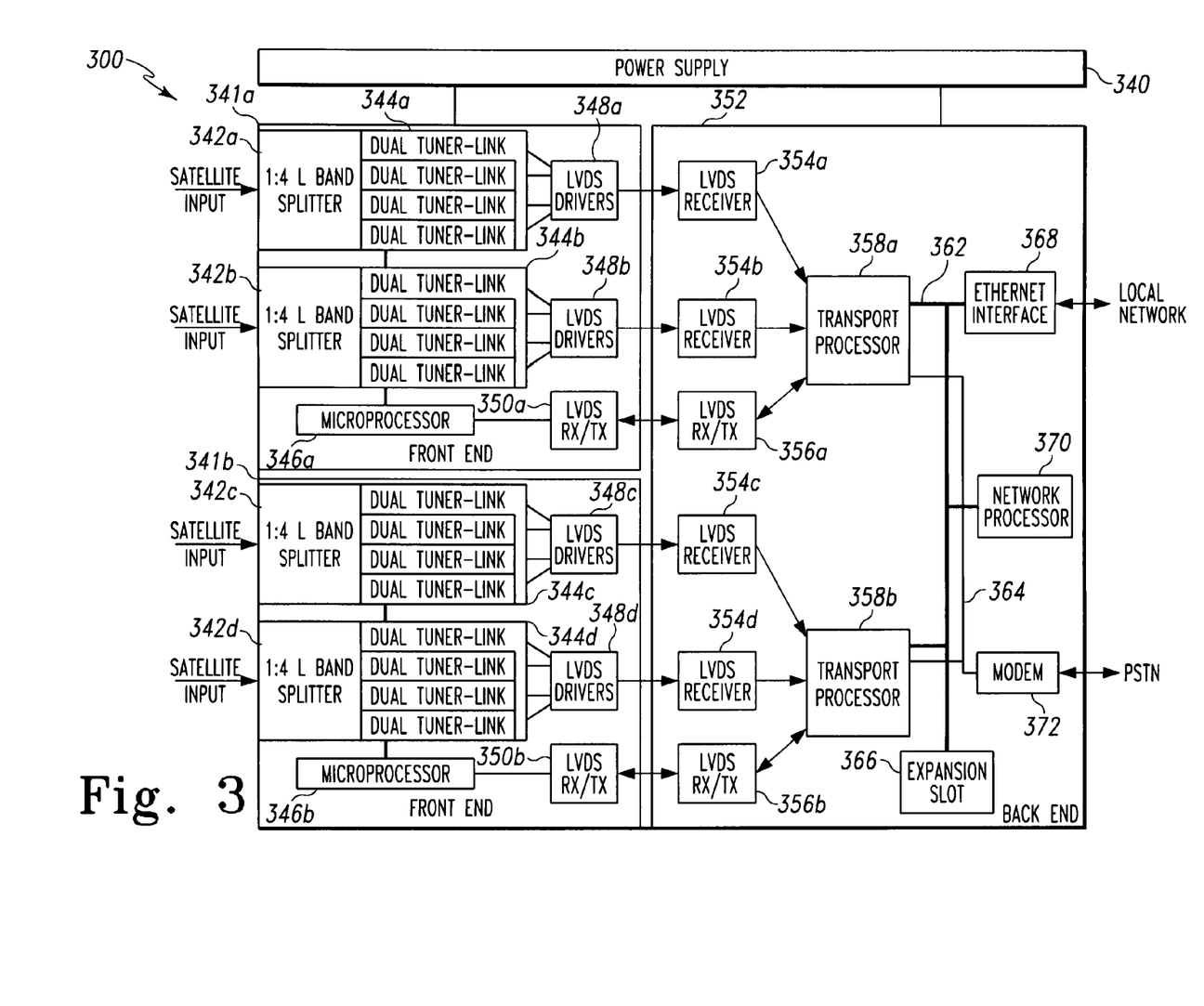
FIG. 3 is a block diagram illustrating an exemplary embodiment of one of the gateway devices of FIG. 1.

Referring now to FIG. 3, a block diagram of an exemplary satellite gateway device 300 is shown. Satellite gateway device 300 is similar to gateway device 10 as described in FIG. 1. As illustrated, the satellite gateway device 300 includes a power supply 340, two front-ends 341a and 341b and a back-end 352. The power supply 340 may be any one of a number of industry-standard AC or DC power supplies configurable to enable the front-ends 341a, b and the back-end 352 to perform the functions described below.

The satellite gateway device 300 may also include two front-ends 341a, b. In one embodiment, each of the front-ends 341a, b may be configured to receive two signals provided from 1:2 splitters, not shown. For example, the front-end 341a may receive two signals from one of the 1:2 splitter and the front-end 341b may receive two signals from a second 1:2 splitter.

The front-ends 341a, b may then further sub-divide the signals using 1:4 splitters 342a, 342b, 342c, and 342d. Once subdivided, the signals may pass into four banks 344a, 344b, 344c, and 344d of dual tuner links. Each of the dual tuner links within the banks 344a-344d may be configured to tune to two services within the signals received by that individual dual tuner link to produce one or more transport streams. Each of the dual tuner links 344a, 344b, 344c, and 344d transmits the transport streams to one of the low-voltage differential signaling ("LVDS") drivers 348a, 348b, 348c, and 348d. The LVDS drivers 348a-348d may be configured to amplify the transport signals for transmission to the back-end 352. In alternate embodiments, different forms of differential drivers and/or amplifiers may be employed in place of the LVDS drivers 348a-348d. Other embodiments may employ serialization of all of the transport signals together for routing to the back end 352.

As illustrated, the front-ends 341a, b may also include microprocessors 346a and 346b. In one embodiment, the microprocessors 346a, b control and/or relay commands to the banks 344a-344d of dual tuner links and the 1:4 splitters 342a-342d. The microprocessors 346a, b may comprise, for instance, ST10 microprocessors produced by ST Microelectronics. In other embodiments, a different processor may be used or the control may be derived from processors in the back end 352. The microprocessors 346a, b may be coupled to LVDS receiver and transmitter modules 350a and 350b. The LVDS receiver/transmitter modules 350a, b facilitate transport signal communications between the banks 344a-344d of dual tuner links and components on the back-end 352, as will be described further below.

Turning next to the back-end 352, the back-end 352 includes LVDS receivers 354a, 354b, 354c, and 354d which are configured to receive transport stream signals transmitted by the LVDS drivers 348a-348d. The back-end 352 also includes LVDS receiver/transmitter modules 356a and 356b which are configured to communicate with the LVDS receiver/transmitter modules 350a, b.

As illustrated, the LVDS receivers 354a-354d and the LVDS receiver/transmitters 356a, b are configured to communicate with controllers or transport processors 358a and 358b. In one embodiment, the transport processors 358a, b are configured to receive the transport streams produced by the dual tuner links in the front-ends 341a, b. The transport processors 358a, b may also be configured to repacketize the transport streams into internet protocol (IP) packets which can be multicast over the local network described earlier. For example, the transport processors 358a, b may repackage broadcast protocol packets into IP protocol packets and then multicast these IP packets on an IP address to one or more of the client devices The transport processors 358a, b may also be coupled to a bus 362, such as a 32 bit, 66 MHz peripheral component interconnect ("PCI") bus. Through the bus 362, the transport processors 358a, b may communicate with another controller or network processor 370, an Ethernet interface 384, and/or an expansion slot 366. The network processor 370 may be configured to receive requests for services from the local network and to direct the transport processors 358a, b to multicast the requested services. The network processor 370 may also manage downloads of software used by client devices. In one embodiment, the network processor is an IXP425 produced by Intel and executes software code for receiving information, such as data, from front ends 341a, b. The data downloads may also occur using the Ethernet interface 368 or modem 372. The data may include metadata, one or more executable files, a first authentication element, and a second authentication element. Network processor 370 determines if the second authentication element is valid for the gateway device and provides the first authentication element and a second file, associated with the first file, for storage, transmission, and later use by one or more client devices if the second authentication element is valid for the gateway device. The association between the first file and the second file may include, but is not limited to, the first file containing metadata identifying the second file and the second file being contained within the first file. While not illustrated, the network processor 370 may also be configured to transmit status data to a front panel of the satellite gateway device 300 or to support debugging or monitoring of the satellite gateway device 300 through debug ports.

As illustrated, the transport processors 358a, b are coupled to the Ethernet interface 368 via the bus 362. In one embodiment, the Ethernet interface 368 is a gigabit Ethernet interface that provides either a copper wire or fiber-optic interface to the local network. In other embodiments, other interfaces such as those used in digital home network applications may be used. In addition, the bus 362 may also be coupled to an expansion slot, such as a peripheral component interface (PCI) expansion slot to enable the upgrade or expansion of the satellite gateway device 300.

The transport processors 358a, b may also be coupled to a host bus 364. In one embodiment, the host bus 364 is a 16-bit data bus that connects the transport processors 358a, b to a modem 372, which may be configured to communicate over the public switched telephone network (PSTN) 28. In alternate embodiments, the modem 372 may also be coupled to the bus 362.

The network processor 370 may also contain a memory for storing information regarding various aspects of the operation of the gateway device 300. The memory may reside within the network processor 370 or may be located externally, although not shown. The memory may be used to store status information, such as information about timers and network announcements, as well as tuning information for the receiving resources.

It is important to note that transport processors 358a, b, network processor 370, and microprocessors 346a, b may be included in one larger controller or processing unit capable of performing any or all of the control functions necessary for operation of the satellite gateway device 300. Some or all of the control functions may also be distributed to other blocks and not affect the primary operation within satellite gateway device 300.

Figure 4:
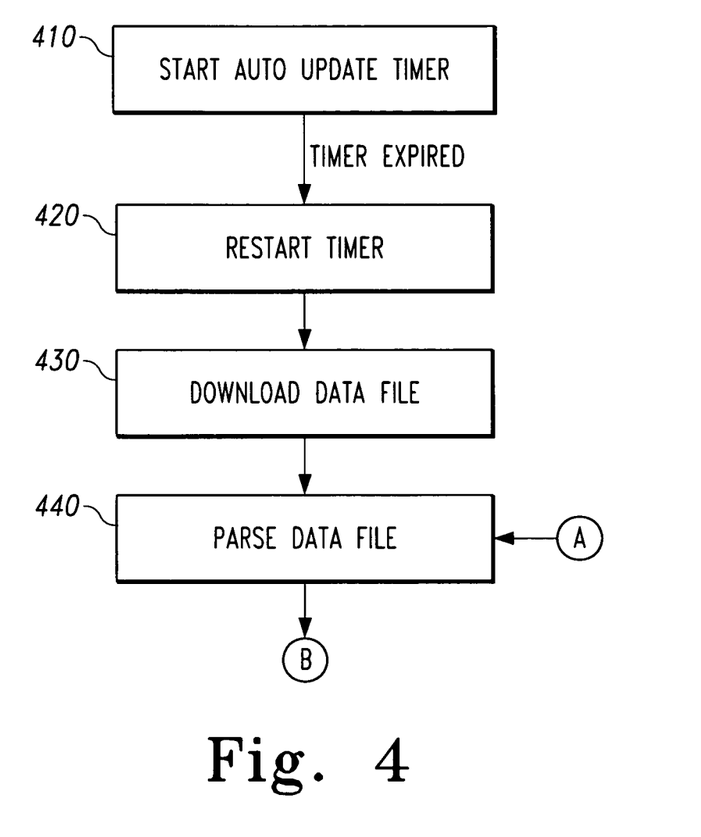
FIG. 4 is a flow chart illustrating an exemplary method using embodiments of the present disclosure.
Figure 5:
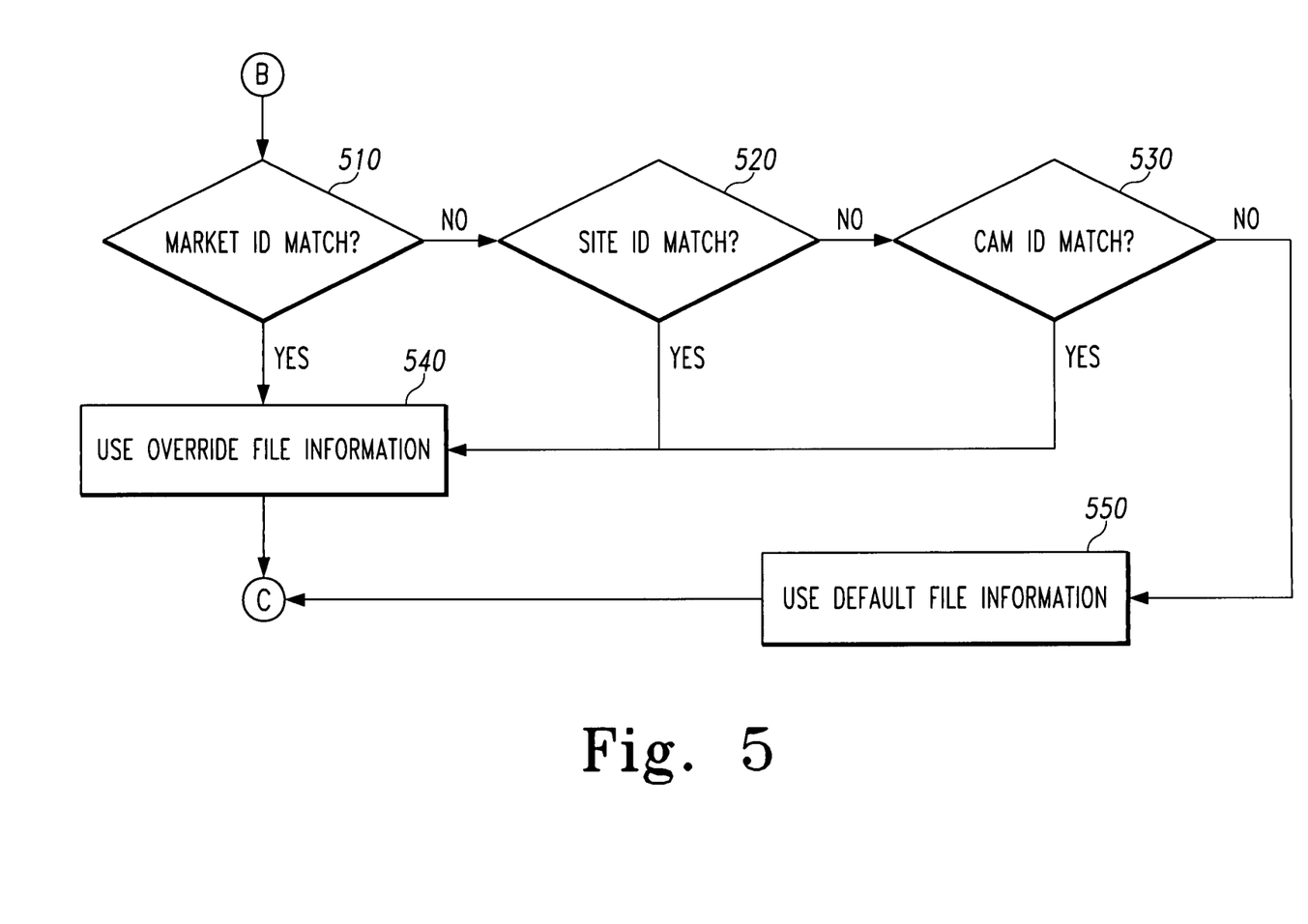
FIG. 5 is a continuation of the flow chart of FIG. 4 illustrating an exemplary method using embodiments of the present disclosure.
Figure 6:
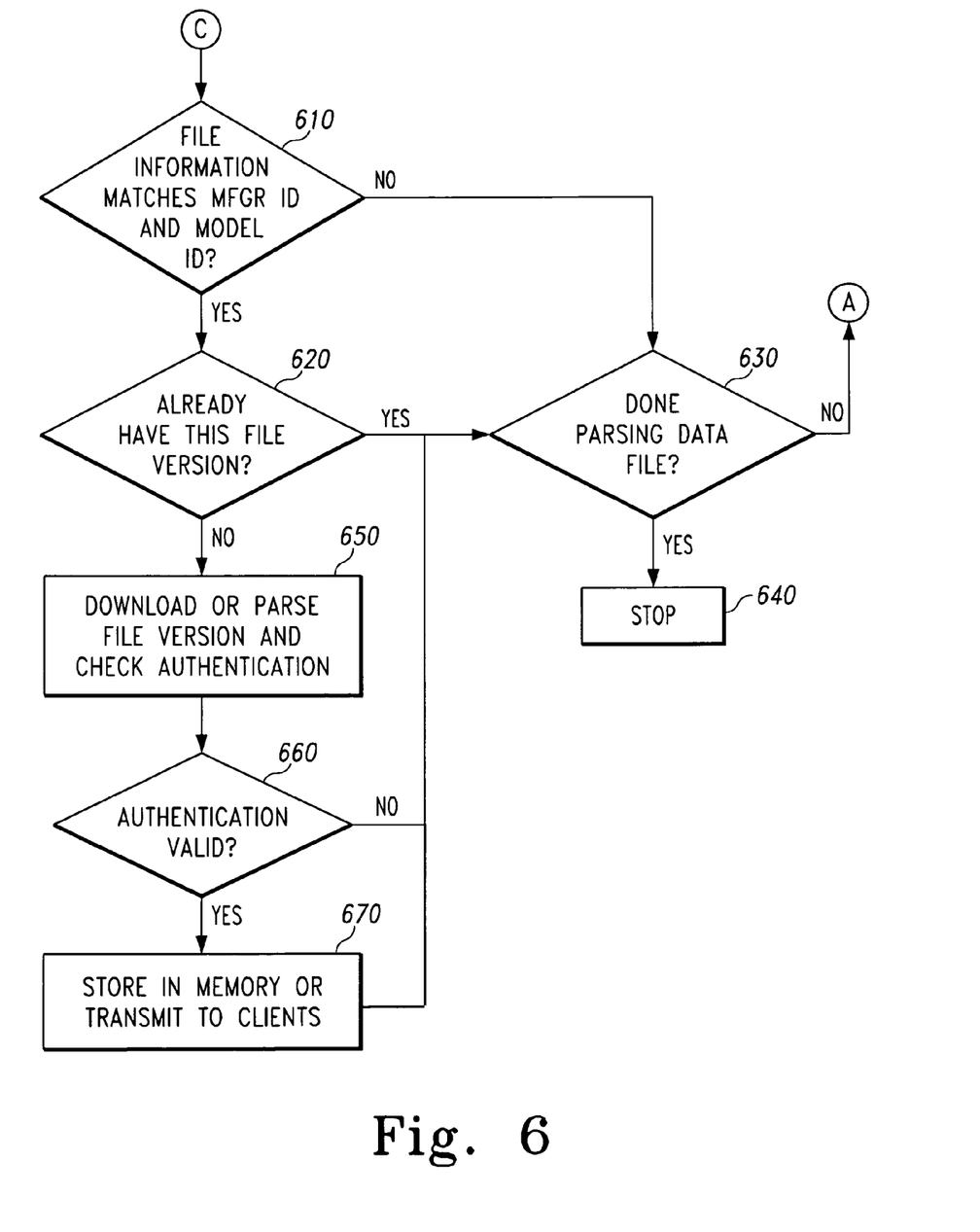
FIG. 6 is a continuation of the flow chart of FIG. 5 illustrating an exemplary method using embodiments of the present disclosure.

Referring to FIGS. 4 to 6, a flowchart illustrating an exemplary method of the present disclosure is shown. For purposes of example and explanation, the method of FIGS. 4 to 6 will be described with reference to system 100 of FIG. 1 and the elements of gateway device 10 of FIG. 2. It should be noted that the method of FIGS. 4 to 6 may equally be described with reference to gateway device 300 in FIG. 3. Also for purposes of example and explanation, the steps of FIGS. 4 to 6 will be primarily described with reference to only one gateway device 10. In practice, however, it is anticipated that each gateway device 10 in a given MDU installation may separately and independently perform some or all of the steps of FIGS. 4 to 6. The steps of FIGS. 4 to 6 are exemplary only, and are not intended to limit the present disclosure in any manner.

At step 410, an automatic update timer is started. According to an exemplary embodiment, each gateway device 10 maintains the automatic update timer for purposes of determining when to start a file upgrade process. As indicated in FIG. 4, expiration of the automatic update timer causes the timer to be restarted at step 420. From step 420, process flow advances to step 430 where the file upgrade process starts.

At step 430, a data file is downloaded to gateway device 10 from a signal source such as a predetermined file server (e.g., sftp.mfh3.com, etc.). The downloaded data file may be received by an input of Gateway device 10 such as I/O 12. The received data file contains metadata including descriptions of files available to download from the same or a different remote file server. According to an exemplary embodiment, the data file format used is Extensible Markup Language (XML), although different types of file formats could also be used. XML provides a foundation for creating documents and document systems. XML operates on two main levels: first, it provides syntax for document markup; and second, it provides syntax for declaring the structures of documents. Most importantly, XML provides a basic syntax that can be used to share information between different kinds of computers, different applications, and different organizations without needing to pass through many layers of conversion. According to this exemplary embodiment, each entry in the data file downloaded at step 430 may contain one or more XML information types. Examples of XML information types include filename, file version, file size, file type, file information, and authentication information such as a signature flag. Other file attributes than those listed above are possible as well.

According to an exemplary embodiment, the XML file also contains an "override" section. As will be explained later herein, this override section allows a head end operator to specify that some gateway devices 10 should download certain files depending on the particular identification information stored by the gateway devices 10.

From step 430 and "A", process flow advances to step 440 where gateway device 10 parses the downloaded data file. According to an exemplary embodiment, processor 14 parses and examines the contents of the data file at step 440. As indicated above, the data file contains descriptions of files available to download. Such files may, for example, include executable files for gateway device 10, configuration files for gateway device 10, key files for gateway device 10, executable files for one or more client devices, and/or other types of files. Executable files may also be referred to herein as "images". XML-specific information that may be utilized in this embodiment is as follows:

File information types are indicated by XML tags as follows: <tag name>information</tag name>

The complete XML structure for one file is:

```
<Gateway Image="AAAA">
    <Manufacturer ID="##">
        <Model ID="####">
            <Version>##.##.##</Version>
            <Size>#######</Size>
            <Signed>#</Signed>
            <FileType>#</FileType>
            <Info></Info>
            <Filename>AAA##_####_##.##.##.zip</Filename>
        </Model>
    </Manufacturer>
</MFH3>
```

For example, a file for a given model number of a client device may be specified as follows:

```
<Gateway Image="Client">
    <!-- Thomson -->
        Manufacturer ID="7d">
            <!-- D11i -->
            <Model ID="000e">
                <Version>01.02.03</Version>
                <Size>1234567</Size>
                <Signed>Y</Signed>
                <FileType>Zip</FileType>
                <Info></Info>
                <Filename>mid7d_000e.01.02.03.zip</Filename>
            </Model>
        </Manufacturer>
</Gateway>
```

The XML structure can be conceptually considered as a directory structure with the attributes as part of the directory name. In other words, the information for the above file is conceptually in the directory "Gateway: Client/Manufacturer:7d/Model:000e".

A file for a given model of a second client device is indicated by adding the following information before the </Manufacturer> tag:

```
<!-- Client01 -->
<Model ID="000f">
    <Version>01.02.03</Version>
    <Size>1234567</Size>
    <Signed>N</Signed>
    <FileType>Bin</FileType>
    <Info></Info>
    <Filename>mid7d_000f.01.02.03.bin</Filename>
</Model>
```

The XML file may create a "directory" once. In other words, all client device entries may be between the tag <Gateway Image="Client"> and the tag </Gateway>. All client images from Thomson may be between the tag <Manufacturer ID="7d"> and the tag </Manufacturer>.

The syntax of the aforementioned "override" section is as follows:

```
<Override>
    <CAM ID="001579046168">UseBeta</CAM>
    <CAM ID="001579046169">UsePrevious</CAM>
    <Site ID="Alpha">UseAlpha</Site>
    <MarketID="93">UseIndy</Market>
</Override>
```

It is important to note that, in addition to containing information and descriptions of files available for download, the data file may also include part or all of the available files themselves. Including the files as a portion of the original data file download potentially eliminates an additional download and communication step.

From step 440, process flow advances to step 510 of FIG. 5, as indicated by "B". At step 510, gateway device 10 makes a determination as to whether a market identification for gateway device 10 (if a gateway file) or an applicable client device (if a client file) matches a corresponding entry in the override section of the data file. According to an exemplary embodiment, processor 14 performs step 510 by comparing the corresponding entry in the override section of the data file to market identification data for gateway device 10 or the applicable client device stored in memory 16.

If the determination at step 510 is negative, process flow advances to step 520 where gateway device 10 makes a determination as to whether a site identification for gateway device 10 (if a gateway file) or an applicable client device (if a client file) matches a corresponding entry in the override section of the data file. According to an exemplary embodiment, processor 14 performs step 410 by comparing the corresponding entry in the override section of the data file to site identification data for gateway device 10 or the applicable client device stored in memory 16.

If the determination at step 520 is negative, process flow advances to step 530 where gateway device 10 makes a determination as to whether a conditional access module (CAM) identification for gateway device 10 (if a gateway file) or an applicable client device (if a client file) matches a corresponding entry in the override section of the data file. According to an exemplary embodiment, processor 14 performs step 410 by comparing the corresponding entry in the override section of the data file to CAM identification data for gateway device 10 or the applicable client device stored in memory 16.

If the determination at either step 510, 520 or 530 is positive, process flow advances to step 540 where it is determined by processor 14 that gateway device 10 will use override file information to identify the name of the file version to download or to parse from the original data file. That is, the name of the file version to download or parse is obtained from the override section of the data file. In the example above, if the determination at step 510 is positive (i.e., market identification match), the name of the file version to download is "UseIndy". Similarly, if the determination at step 520 is positive (i.e., site identification match), the name of the file version to download is "UseAlpha". Also, if the determination at step 530 is positive (i.e., CAM identification match), and the CAM identification of gateway device 10 or the applicable client device is "001579046168" then the name of the file version to download is "UseBeta". Conversely, if the determinations at each of steps 510, 520 and 530 are negative, process flow advances to step 550 where it is determined by processor 14 that gateway device 10 will use default file information to identify the name of the file version to download. The default file information is also specified in the data file, but is not expressly shown above. Similar steps are taken if the identified executable file is parsed from the original data file.

From step 540 or step 550, process flow advances to step 610 of FIG. 6, as indicated by "C". At step 610, a determination is made as to whether the file information (i.e., override information per step 540 or default information per step 550) matches the manufacturer identification and model identification for gateway device 10 or a particular client device. According to an exemplary embodiment, processor 14 performs step 610 by comparing the manufacturer identification and model identification entries of the data file to manufacturer identification and model identification data for gateway device 10 or the particular client device stored in memory 16.

If the determination at step 610 is positive, process flow advances to step 620 where a determination is made as to whether gateway device 10 has already stored the version of the file specified by the override or default information. According to an exemplary embodiment, processor 14 performs step 620 by comparing the version of the file specified by the override or default information to the file version currently stored in memory 16.

If the determination at step 610 is negative, or the determination at step 620 is positive, process flow advances to step 630 where a determination is made as to whether gateway device 10 is done parsing the data file. According to an exemplary embodiment, processor 14 performs step 630 by determining whether the entire data file has been parsed. If the determination at step 630 is positive, process flow advances to step 640 where the method ends. Alternatively, if the determination at step 630 is negative, process flow loops back to step 440 of FIG. 4 as indicated by "A" and the aforementioned steps are repeated until the entire data file is parsed for all file types of interest, namely files for gateway device 10 as well as for any associated client devices.

Referring now back to step 620, if the determination there is negative, process flow advances to step 650 where the new file version is downloaded to gateway device 10 and an authentication element (i.e., signature) associated with the gateway device 10 that is appended to the new file version is checked under the control of processor 14. The newly downloaded file may be received in a manner similar to that described for step 430. Alternately, at step 650, the new file version can be parsed from the original data file if the file version is included as a portion of the original data file and the authentication element is checked. At step 660, processor 14 determines whether the authentication element (i.e., signature) associated with the gateway device 10 is valid. According to an exemplary embodiment, processor 14 performs step 660 by decrypting the authentication element (i.e., signature) using a public key of gateway device 10 stored in memory 16 to thereby recover the file's hash value. Processor 14 then computes its own hash value over the file (not including the signature portion). Processor 14 doesn't compute its own hash value over the signature portion because this portion has already been decrypted to determine the first hash value. Processor 14 then compares the two hash values. If the two hash values agree, the signature is considered valid. Conversely, if the two hash values do not agree, the signature is considered invalid. It is important to note that the authentication process here may be accomplished independent of, and without changing, any authentication element (i.e. signature) that may be included in the file for use by a client device. In this manner, the security and integrity of the client authentication element is unaltered, unaffected, or unidentified by the operations of the gateway device 10.

Figure 7:
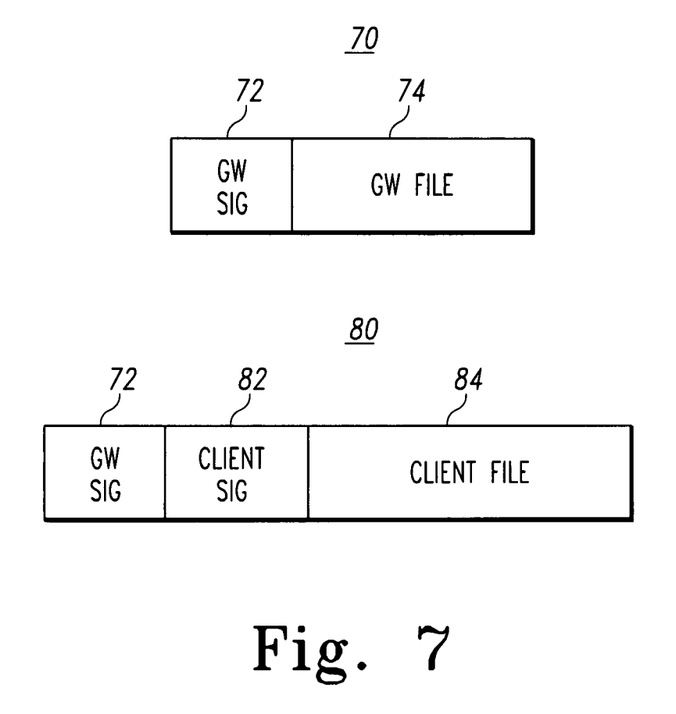
FIG. 7 is a diagram of exemplary data structures using embodiments of the present disclosure.

According to an exemplary embodiment, downloaded files for gateway device 10 include only one authentication element, while downloaded files for client devices include two different authentication elements. In FIG. 7, an exemplary data structure 70 for a downloaded file for gateway device 10 includes a gateway signature 72 appended to a gateway file 74. Additionally, an exemplary data structure 80 for a downloaded file for a client device includes a client signature 82 appended to a client file 84, and further includes gateway signature 72 appended thereto by the gateway device 10 manufacturer or a service provider. As described above, the data structures shown in FIG. 7 represent the data structures used in downloading a gateway file and appended gateway signature. The received gateway file may contain identification for one or more client files that, in the same step or in a separate step, are downloaded along with appended client signatures and gateway signatures. The use of a separate gateway file for identifying client files may be important, for instance, when multiple client device vendors are providing client files and client signatures.

In data structure 80, client signature 82 and client file 84 are not altered, but are treated as an opaque data file with no assumptions made about its format or contents. The addition of gateway signature 72 to client signature 82 and client file 84 represents an over-signature by the gateway device 10 manufacturer or a service provider. This over-signature is generated using a signing key selected for exclusive use by a particular gateway device vendor and/or gateway device model number. According to an exemplary embodiment, all client device files, regardless of manufacturer or model number, are over-signed using the same gateway signing key. When gateway device 10 receives a new or updated client device file, it verifies its over-signature using the gateway signing key (public key, if public/private cryptosystem used) and/or gateway signature verification routine. According to an exemplary embodiment, processor 14 only determines whether the outermost signature is valid at step 660 in FIG. 6. That is, processor 14 only checks the validity of gateway signature 72 at step 660.

It is important to note that the data structures shown in FIG. 7 may be merged into a single data structure. In one embodiment of a merged structure, one or more individual client device files along with appended individual client signatures are concatenated with a gateway device file. A gateway signature is appended to the concatenated structure and serves as the over-signature for the merged structure. The merged structure described here is representative of a data structure in which the client files are parsed from the downloaded file, as described above. The merged structure may be desirable for more efficient downloads particularly for device file downloads involving multiple client device models from a single device manufacturer.

Returning to FIG. 6, if the determination at step 660 is positive, process flow advances to step 670 where the newly downloaded file version is stored in a non-volatile portion of memory 16 under the control of processor 14. Storing the newly downloaded file version in a non-volatile portion of memory 16 prevents potential network and device security issues due to for instance, an unexpected operational interruption such as a power outage. According to an exemplary embodiment, when storing the file version for a client device at step 670, gateway device 10 discards the over-signature bytes (i.e., gateway signature 72), leaving the original client signature 82 and client file 84 intact. Gateway device 10 stores this original signed client file to a nonvolatile portion of memory 16, and may later transmit or download the same to one or more client devices following, for example, the reception of a reboot/file download request from the client device. From step 670, process flow advances to step 630, as previously described above.

One advantage of the embodiments described above is that all models of client devices, regardless of manufacturer, can be over-signed with a single gateway signing key, thus simplifying the management of multiple models/manufacturers, while retaining all of the security benefits that client file signing provides. In addition to other features, the over-signing described above allows the co-existence of a signing key for use in gateway device 10 and a separate signing key for use once files intended for client devices are delivered to the client devices.

The embodiments described herein relate to mechanisms for automatically upgrading gateway device files, as well as client device files, with minimal operator intervention. The mechanisms use a metadata file that is first downloaded from a remote file server. The metadata file contains descriptions of the files available to download from the same or a different remote file server. The metadata file contains information to permit a global download to all gateway devices, or targeted downloads based on particular parameters such as a specific region, specific site, and/or specific unit.

Further, the embodiments describe an over-signing technique applied so that third-party files may be validated without requiring access to or knowledge of the original key or algorithm used to sign them. The over-signing technique greatly simplifies the management of these images while retaining all of the security benefits that image signing provides. The over-signing technique may be used in conjunction with the download mechanisms described herein, or with other download control mechanisms.

While the embodiments have been described as having a preferred design, the present embodiments can be further modified within the spirit and scope of this disclosure. This application is therefore intended to cover any variations, uses, or adaptations of the embodiments using their general principles. Further, this application is intended to cover such departures from the present disclosure as come within known or customary practice in the art to which this disclosure pertains and which fall within the limits of the appended claims.

What is claimed is:

1. A method for downloading files associated with the operation of a gateway device in a network, comprising the steps of:

Receiving, at the gateway device, data comprising a first file, a first authentication element, and a second authentication element, said first authentication element being unique to a client device associated with the gateway device, and said first file containing metadata;

determining, at the gateway device, if said second authentication element is valid for said gateway device; and storing, at the gateway device, said first authentication element and a second data file, associated with said first file and comprising an executable file, for said client device if said second authentication element is valid for said gateway device.

2. The method of claim 1, further comprising the step of transmitting said first authentication element and said second file from said gateway device to said client device.

3. The method of claim 1, wherein said second file is contained in a portion of said first file.

4. The method of claim 1, wherein said first authentication element and said second authentication element are appended to said second file.

5. The method of claim 4, wherein said second authentication element is signed over said first authentication element without change to said first authentication element.

6. The method of claim 4 wherein said second authentication element is appended to said second file and said first authentication element by at least one of a service provider and a manufacturer of said gateway device.

7. The method of claim 1, wherein the step of determining further includes the steps of:
   determining whether said first file includes at least one identification element matching at least one corresponding identification element associated with said client device; and
   identifying said second file using information within said first file based on said determination.

8. The method of claim 7, further comprising the step of receiving said second file based on said identification.

9. The method of claim 1 wherein said second file is downloaded by the gateway.

10. A gateway device, comprising:
    A receiver that receives data, said data including a first authentication element, a first file containing a metadata file, and a second authentication element, said first authentication element being unique to a client device associated with said gateway device;
    a processor coupled to said receiver that determines if said second authentication element is valid for said gateway device; and
    a memory coupled to said processor that stores said first authentication element and a portion of said received data including an executable file for said client device if said second authentication element is valid for said gateway device.

11. The gateway device of claim 10, further comprising a transmitter coupled to said processor that transmits said first authentication element and said portion of said received data from said gateway device to said client device.

12. The gateway device of claim 10, wherein said first authentication element and said second authentication element are appended to said second file.

13. The gateway device of claim 12, wherein said second authentication element is appended to said second file and said first authentication element by at least one of a service provider and a manufacturer of said gateway device.

14. The gateway device of claim 10, wherein said processor further determines whether said first file includes at least one identification element matching at least one corresponding identification element associated with said client device and identifies said second file using information within said first file based on said determination.

* * * * *